E. & J. L. Hall,
Fire-Proof Safe,
No. 923, Reissued Mar. 6, 1860.
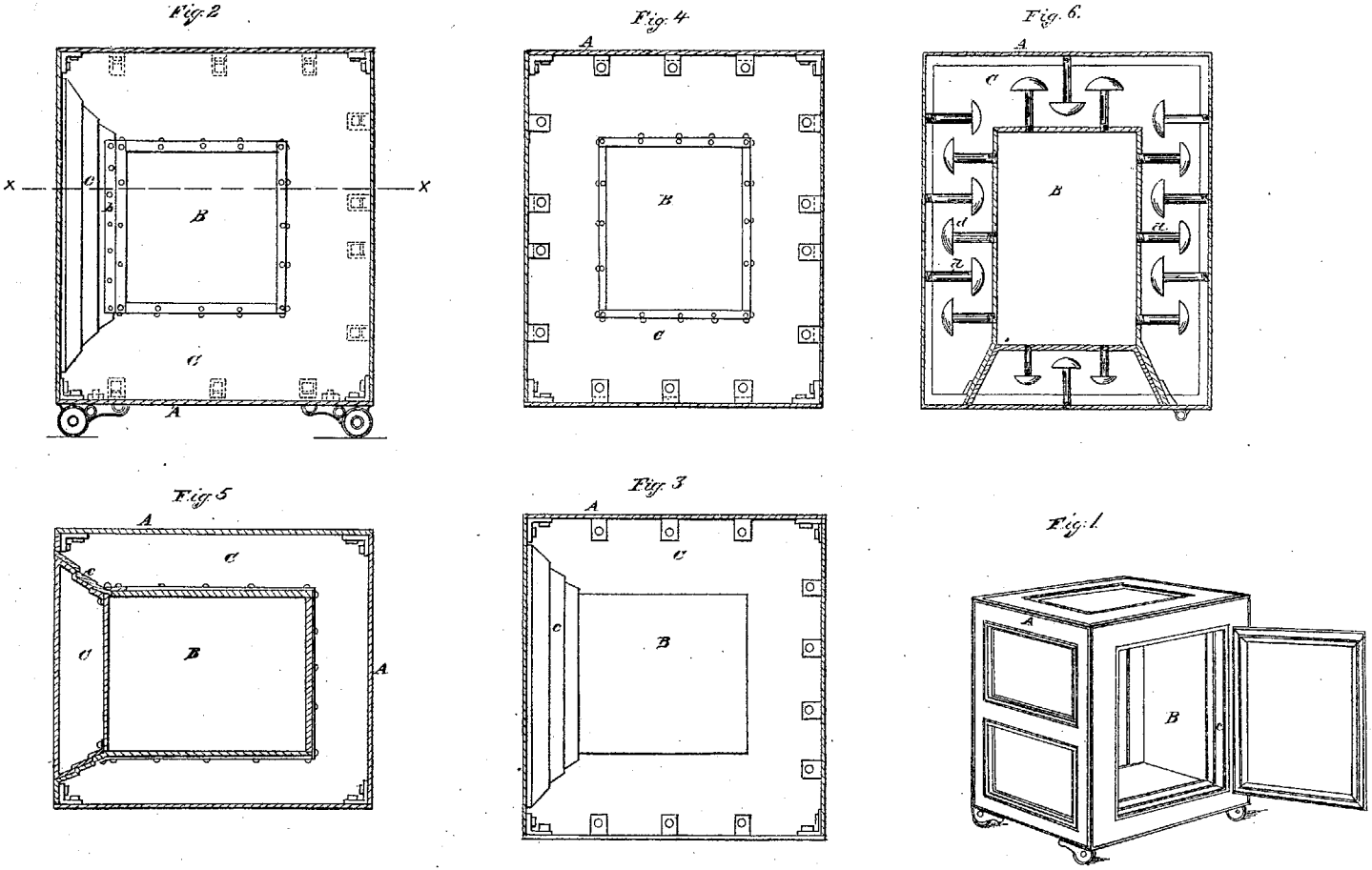
AM. PHOTO-LITHO. CO. N. Y. (OSBORNE'S PROCESS.)

UNITED STATES PATENT OFFICE.

EDWARD HALL AND JOSEPH L. HALL, OF CINCINNATI, OHIO.

IMPROVEMENT IN FIRE-PROOF SAFES.

Specification forming part of Letters Patent No. 6,655, dated August 21, 1849; Reissue No. 152, dated December 18, 1849; Reissue No. 923, dated March 6, 1860.

*To all whom it may concern:*

Be it known that we, EDWARD HALL and JOSEPH L. HALL, of Cincinnati, in the county ty of Hamilton and State of Ohio, have invented a new and useful Improvement in Fire-Proof Safes and Chests; and we do hereby declare that the following is a full and clear description thereof, reference being had to the accompanying drawings, and to the letters of reference marked thereon and made to form a part of this specification.

The object of our invention is the construction of safes and chests which, so far as possible, may offer perfect resistance against the action of fire and the attempts of burglars, and which at the same time may be free from moisture or corrosion, thereby preventing the articles contained therein from molding or other injuries caused by dampness, and preserving the casings of said safes and chests from corrosion or rust; and the nature of our invention relates, first, to the employment of hydraulic cement in part or in whole as forming the insulating medium between the outer and inner cases of safes and chests when said inner cases are formed of iron or other suitable metal; second, to a mode of joining the outer and inner cases of safes and chests by means of the door-frame and the flanges of the inner case or their equivalents, and also by means of anchors attached to and extending from said outer and inner cases into a space between said cases, and being there embedded in an insulating medium as a means of more perfectly uniting the outer and inner cases of safes and chests, as hereinafter described, specified, and represented.

We are aware that various inventions have been essayed to perfect the construction of safes and chests, which should be fire and burglar proof and at the same time free from dampness or corrosion. These devices have failed for two reasons: First, for want of a suitable insulating medium between their outer and inner walls or cases, which should prevent dampness within the safe or the corrosion of its cases; second, a proper device for joining or connecting their outer and inner cases. These difficulties are obviated by means of our invention, as hereinafter described and set forth.

The accompanying drawings represent several views of metallic safes constructed in accordance with our invention, of which—

Figure 1 is a perspective view of an iron safe, representing the door as being open and showing the interior of the inner case. Fig. 2 is a side elevation of the safe, the outer case of which is removed in order to show the adaptation of the cement, and also the construction and arrangement of the inner case. Fig. 3 is a similar view showing another construction of the inner case, which in this view is represented as being plain, without projecting bolts, rivets, or angle-irons. Fig. 4 is a rear view of the safe, the back plate of the outer case being removed. Fig. 5 is a transverse sectional view taken at a point indicated by the red line *x x* in Fig. 2. Fig. 6 is a transverse sectional view of a safe whose outer and inner cases are provided with anchors or flat-headed bolts, which project into the space between the cases, and which are shown as being embedded in the hydraulic cement which fills said space.

A represents the outer wall or case of the safe, formed of suitable sheet metal, and united at the corners by means of angle-irons *a*, to which the sides are firmly bolted or screwed in the most substantial manner. Within the case A is inserted an inner case or box, B, which is also formed of suitable sheet metal, and provided with flanges *b* around its front, which may be secured to the door-frame *c* by means of rivets, thus joining and securing together the outer and inner cases of the safe, and rendering it more secure against the attempts of burglars than safes constructed in the ordinary way. This mode of joining is clearly represented in Figs. 2 and 4.

C represents the space between the outer case, A, and inner case, B, filled with hydraulic cement, which is poured into said space while in a semi-fluid state, so that it may enter and fill perfectly all the interstices and surround and embed all the projecting angle-irons, bolts, and rivets around the inner and within the outer cases of the safe. This said cement, after being poured into said space, immediately attains great hardness and solidity, by means of which the outer and inner cases are more firmly united and rendered much more safe and secure than can be accomplished by means of any of the devices or insulating mediums hitherto employed for like purposes. An admixture or compound not composed entirely of hydraulic cement, but of which said cement forms an important and necessary ingredient and component part, may be used with some facility as the insulating medium between the outer and inner cases of metallic safes and chests; but we prefer the said cement as forming the whole of the said insulating medium, from the fact that is a better non-conductor of heat and a greater safeguard against dampness and corrosion than when forming a part only of the said medium.

*d* are anchors or bolts with flat heads attached alternately to the interior of the outer case and to the exterior of the inner case, as shown clearly in Fig. 6. These anchors or bolts project into the space C between the cases, so that when the cement is poured into said space the said anchors *d* will be perfectly embedded therein, and when the said cement becomes solid and hard, which occurs almost immediately after its application, the whole body of the safe will be most perfectly joined together, and at the same time the outer and inner cases, A B, will be as perfectly insulated as when no bolts or rivets are used between them.

Among the many advantages resulting from our invention a few important ones may be mentioned. First, the hydraulic cement which we use as the insulating medium between the outer and inner cases is the most perfect non-conductor of heat, and whether it may be used in whole or in part its employment in connection with the inner metallic case renders the safe much more secure against the action of fire or the attempts of burglars than any of the ordinary modes of construction. The hardness of the cement and its freedom from moisture after it sets renders the safe dry and free from moisture, and also prevents the corrosion of its cases, therefore rendering them very durable; second, the employment of the inner metallic case, which prevents moisture within the inner case and preserves the articles contained therein from mold or other injury caused by dampness. The hydraulic cement is also a safeguard against corrosion and rust, thereby rendering safes in which it is used strong and durable for a great length of time; third, the anchors *d*, extending only partially across the space *c*, are adapted to join the cases of the safe as perfectly as if they secured to both the outer and inner cases, while at the same time they cannot conduct the heat from the outer to the inner case. The joining of the cases by means of the door-frame and the projecting flanges of the inner case renders the safe much stronger and more secure against burglars than any of the safes constructed in the ordinary manner; fourth, constructing the inner case of metal instead of wood, as has been usual, the wooden cases absorb moisture from the cement as the same is poured into the space surrounding said case, which renders the inner chamber of the safe damp and exposes its contents to injury from mold, &c. This objection is obviated by using metal for the construction of the inner cases.

Having thus described our invention, what we claim as new, and desire to secure by Letters Patent, is—

1. The employment of hydraulic cement, in whole or in part, as forming the insulating medium or admixture used between the outer and inner cases of safes and chests when said inner cases are formed of iron or other suitable metal, substantially as herein described, for the purposes set forth.

2. Joining the outer and inner metallic cases of safes and chests by means of the door-frame *c* and flanges *b*, or their equivalents, when said hydraulic cement, in whole or in part, is used as the insulating medium between said metallic cases, as herein described, and also by means of the anchors or bolts *d*, extending from the outer and inner cases into the space between said cases, substantially as and for the purposes set forth.

In testimony of which invention we have hereunto set our hands.

EDWARD HALL.
JOSEPH L. HALL.

Witnesses:
H. E. CLIFTON,
D. N. B. COFFIN, Jr.